United States Patent
Fan

(10) Patent No.: US 6,182,950 B1
(45) Date of Patent: Feb. 6, 2001

(54) RANDOM PACKING ELEMENT AND METHOD

(76) Inventor: Zhongliang Fan, 2707 Devonshire Dr., Carrollton, TX (US) 75077

(*) Notice: Under 35 U.S.C. 154(b), the term of this patent shall be extended for 0 days.

(21) Appl. No.: 09/156,107

(22) Filed: Sep. 18, 1998

(51) Int. Cl.$^7$ ....................................................... B01F 3/04
(52) U.S. Cl. ...................................... 261/94; 261/DIG. 72
(58) Field of Search .................................. 261/94, 95, 98, 261/DIG. 72; 96/290

(56) References Cited

U.S. PATENT DOCUMENTS 2,602,651 * 7/1952 Cannon ......................... 261/DIG. 72
4,366,608 * 1/1983 Nagaoka ....................... 261/DIG. 72
5,543,088 * 8/1996 Halbirt ................................... 261/94

* cited by examiner

*Primary Examiner*—David A. Simmons
*Assistant Examiner*—Robert A. Hopkins
(74) *Attorney, Agent, or Firm*—Locke Liddell & Sapp LLP

(57) ABSTRACT

A random packing element comprising a transfer element, wherein said transfer element has an edge, said edge being configured with a plurality of alternating depressions and extensions, said extensions being substantially curved in shape, said transfer element having a first surface and a second surface, said first surface preferably including a plurality of protuberances.

16 Claims, 5 Drawing Sheets

RANDOM PACKING ELEMENT AND METHOD

FIELD OF THE INVENTION

The present invention relates to methods and apparatus for enhancing exchange processes between two fluids. More particularly, the present invention relates to random packing elements for use in exchange process chambers, such as are utilized in mass transfer or heat exchange processes, for example.

BACKGROUND OF THE INVENTION

Many commercial and chemical processes involve mass transfer or heat exchange, and utilize packed columns or chambers to carry out process steps. Such processes can include distillation, absorption and desorption, gas cleaning and drying, scrubbing and various biological processes, such as filtration. Two fluids, usually a gas and a liquid, although two liquids may be utilized, are intermingled within a chamber, typically as counterflow streams wherein two fluids move generally in opposite directions along the same flow axis. The two fluids may however move in the same direction along a flow axis (in a co-current system) or in separate, intersecting directions (in a cross-current system).

Mass transfer and/or reaction rates in such processes increase with increasing amounts of effective surface area that can be wetted by liquid within the chamber and over which the two fluids can then interface with each other. Packing elements are placed in the chamber to increase the surface area available for such interfacing. Packing systems come in two basic types: structured and random. Structured packing systems generally include extended arrays of structured packing elements that are arranged within the chamber. Random packing systems utilize large numbers of individual packing elements which are dumped into the chamber, thereby forming a random array.

Several considerations influence the design of random packing elements. It is important to maximize mass transfer and/or reaction rates through the packing system. A method of maximizing mass transfer and/or reaction rates is to maximize the surface area that can be wetted by a liquid within the chamber, thereby maximizing the area over which two or more fluids may interface. It is important to minimize pressure drop through a packing system. A method of minimizing pressure drop is to maximize the amount of free volume within the chamber by minimizing the volume of random packing element material within the chamber. It is important that the random packing elements be sufficiently strong and rigid to maintain their shape while supporting the weight of other random packing elements located higher in the chamber. It is also important that these random packing elements be capable of low-cost mass production. Indeed, one great advantage of random packing systems over higher-efficiency (high mass transfer and/or reaction rates per unit of pressure drop across the system) structured packing systems is the relatively low cost of random packing systems.

Myriad examples of random packing elements configurations have been utilized in random packing systems. However, a strong need is still felt for random packing elements which, when utilized, can more closely approach the high efficiency of structured packing columns while maintaining the cost advantages of random packing systems. The present invention provides improvements to existing random packing elements which address these needs.

SUMMARY OF THE INVENTION

The present invention provides improvements to random packing elements for use in exchange process apparatus involving at least two fluids, wherein the random packing element comprises a body, which in turn includes at least one transfer element. A plurality of protuberances extend from at least one surface of the transfer element. These protuberances have a curved surface and are preferably convex in shape. Each protuberance is preferably matched with a cavity on the opposite surface of the transfer element, and apertures may penetrate through the protuberances and into the corresponding cavities. The apertures in the protuberances may be oriented in a particular direction if so desired.

The present invention also provides a random packing element having a transfer element including at least one edge which comprises a plurality of alternating curved extensions and depressions. The extensions and depressions are preferably substantially semi-circular in shape and have radii of about 3 millimeters, thereby making the edge of the transfer element substantially sinuous in configuration.

Random packing elements of the present invention may be manufactured from a single sheet of material, preferably a metal, which is substantially rectangular in shape. The sheet is then punched to form the desire protuberances, cavities, and apertures, and sinuous incisions are made to define the desired number of transfer surfaces. The transfer surfaces are then bent to achieve a random packing element of the desired configuration.

The random packing elements of the present invention increase available surface area on transfer elements over which fluids in a random packing bed may interact, improve structural rigidity and strength, increase the likelihood of impact between a transfer element edge and descending droplets of fluid, and work in conjunction with the beading tendencies of liquids to increase the area of on a transfer element over which a given volume of fluid may spread.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION OF THE PREFERRED EMBODIMENTS

Figure 1:
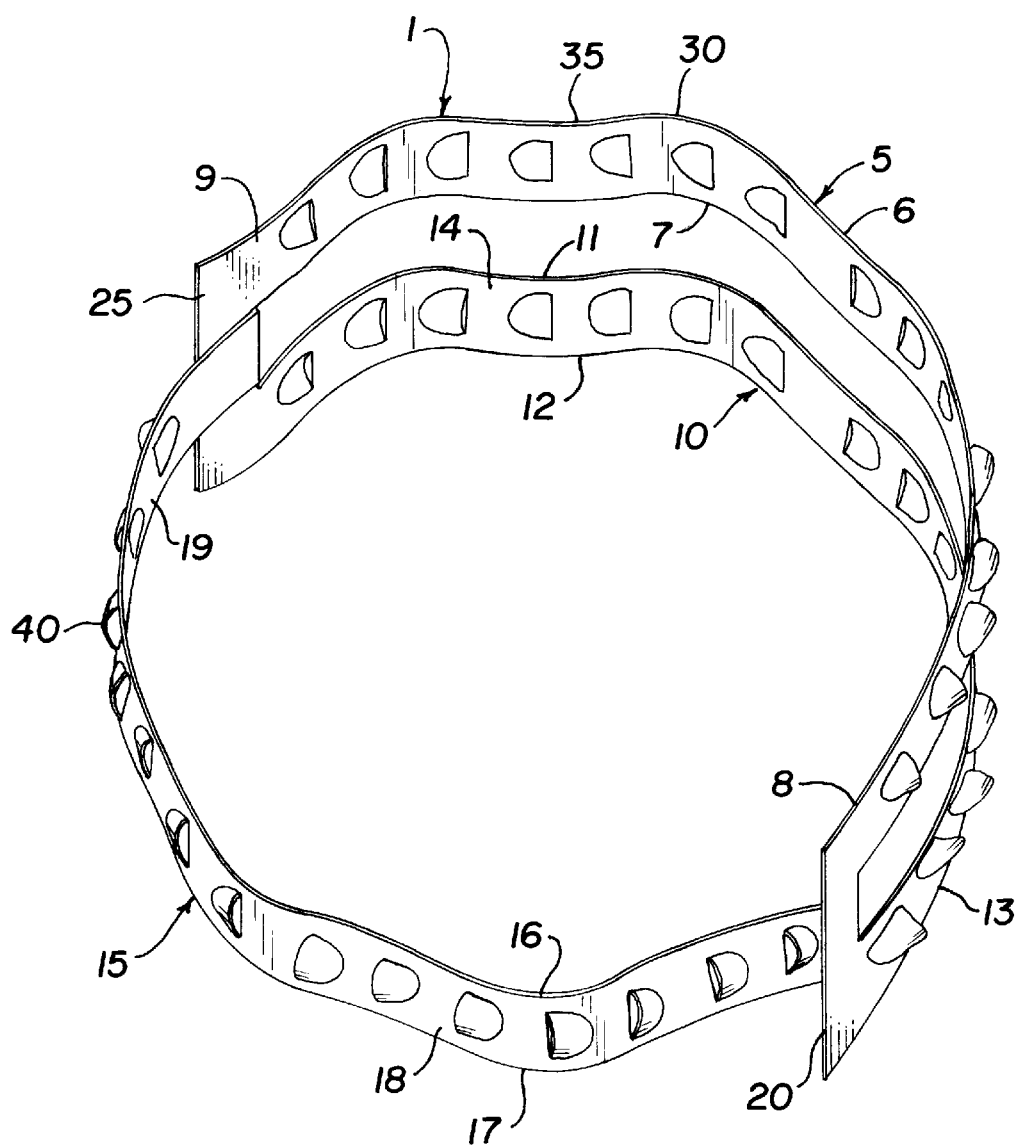
FIG. 1 is a perspective view of the present random packing element.

FIG. 1 illustrates a perspective view of the present random packing element. This preferred embodiment comprises a body, generally defined by the numeral 1. Body 1 includes an upper transfer element 5, a lower transfer element 10, and an intermediate transfer element 15. Each of transfer elements 5, 10, and 15 extend from a first connecting strip 20 to a second connecting strip 25, with intermediate transfer element 15 engaging first connecting strip 20 and second connecting strip 25 intermediate of upper transfer element 5 and lower transfer element 10. Each of transfer elements 5, 10 and 15 are arcuately curved, with intermediate transfer element 15 curving in a direction substantially opposite from the direction in which upper transfer element 5 and lower transfer element 10 curve.

Each of transfer elements 5, 10, and 15 has an upper edge (6, 11, and 16 respectively) and a lower edge (7, 12, and 17 respectively). Each of these edges 6, 7, 11, 12, 16, and 17 is substantially sinuous in shape, being configured with a plurality of alternating extensions 30 and depressions 35. Finally, each of transfer elements 5, 10, and 15 comprises a first surface (8, 13, and 18 respectively) and a second surface (9, 14, and 19 respectively), and includes a plurality of protuberances 40 extending from said first surfaces 8, 13, and 18.

Figure 2:
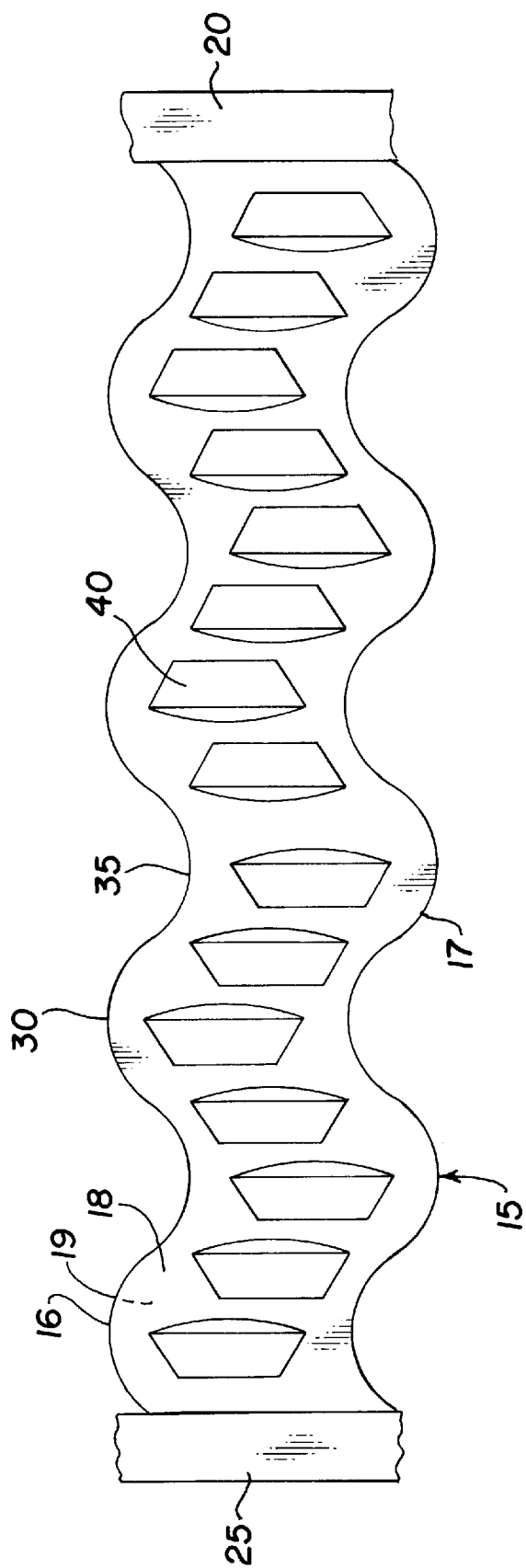
FIG. 2 is a front view of an edge of a transfer element of the present random packing element.

FIG. 2 illustrates a more detailed front view of upper edge 16 of intermediate transfer element 15 of the preferred embodiment of FIG. 1. As illustrated, each of alternating extensions 30 and depressions 35 is substantially semi-circular in shape. This shape provides a significant improvement over transfer elements in existing random packing elements by increasing the effective surface area of intermediate transfer element 15. It is well known that during the operation of a bed of random packing elements, droplets of one liquid filter downward through the bed and interact with a second fluid (a vapor, for example). During the course of their downward migration, these droplets may drip from one random packing element to another. When in contact with a random packing element, surface tension encourages the droplet of liquid to form ball-like "beads", thereby minimizing the surface area of the droplet. Curved extensions 30 of upper edge 16 of intermediate transfer element 15 naturally accommodate the formation of such "beads" by providing a surface whose configuration matches that which the droplet of liquid itself seeks to achieve. The present transfer element edge configuration is in sharp contrast to those of existing random packing elements, where droplets of liquid interacting with substantially straight edges may fail to bead and instead "run-off" the edge of the transfer element. Thus, though the configuration of upper edge 16 may not substantially increase the actual surface area of intermediate transfer element 15, edge 16 does increase the effective surface area of transfer element 15 by permitting increased beading of liquid droplets along upper edge 16.

By increasing the length of upper edge 16, extensions 30 and depressions 35 also advantageously increase the probability that a descending droplet of liquid will impact upper edge 16. Upon impacting upper edge 16 droplets of liquid may split into smaller droplets of water advantageously having a greater surface area than the previously existing larger droplet of water, thereby providing more contact area between the descending droplets and the ascending second fluid. The impact of droplets of liquid upon upper edge 16 also advantageously promotes coating of intermediate transfer element 15 by at least a portion of said droplet.

Considerations in determining the size of extensions 30 include: (1) providing as many extensions as possible on a given edge to accommodate as many beads as possible; and (2) providing extensions large enough to accommodate the largest beads of liquid likely to be encountered in the packing bed (extensions too small to accommodate all or part of beads of liquid would not realize the intended advantages over the straight edges of the prior art). The semi-circular extensions 30 and depressions 35 of the preferred embodiment of FIG. 2 have radii, for example, of between 2 and 5 millimeters, and preferably of about 3 millimeters, and should therefore accommodate both of these interests.

Figure 3:
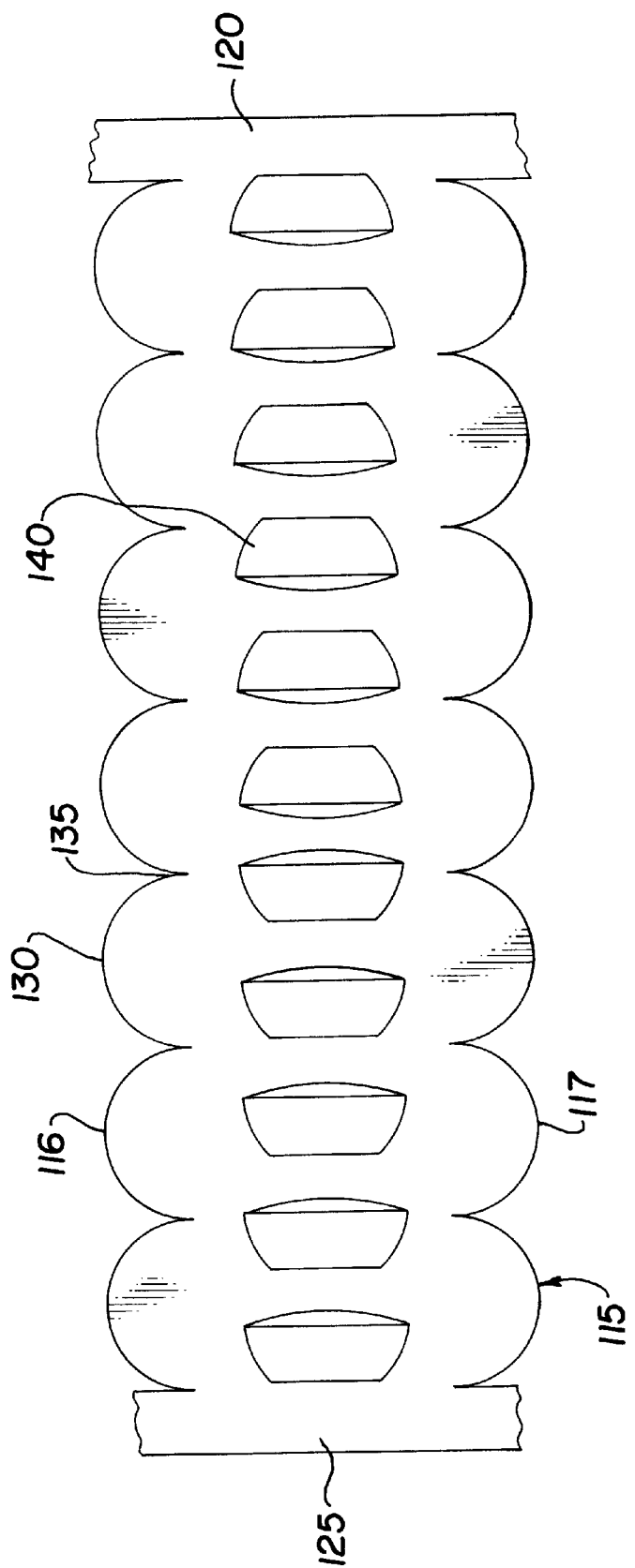
FIG. 3 is a rear view of an edge of a transfer element of an alternate embodiment of the present random packing element.

FIG. 3 provides a front view of an alternate embodiment of the present invention, utilizing a different pattern of extensions 130 and depressions 135 on upper edge 116 of intermediate transfer element 115. In this embodiment of the invention extensions 130 remain substantially semi-circular in configuration with radii of about 3 millimeters, for example. However, depressions 135 are not semi-circular in configuration, and are instead merely formed by the intersection of adjacent extensions 130. This embodiment advantageously provides a greater number of extensions 130 than the embodiment of FIG. 2. However, the embodiment of FIG. 2 may be more cheaply constructed than that of FIG. 3, using the manufacturing techniques discussed infra.

Figure 4:
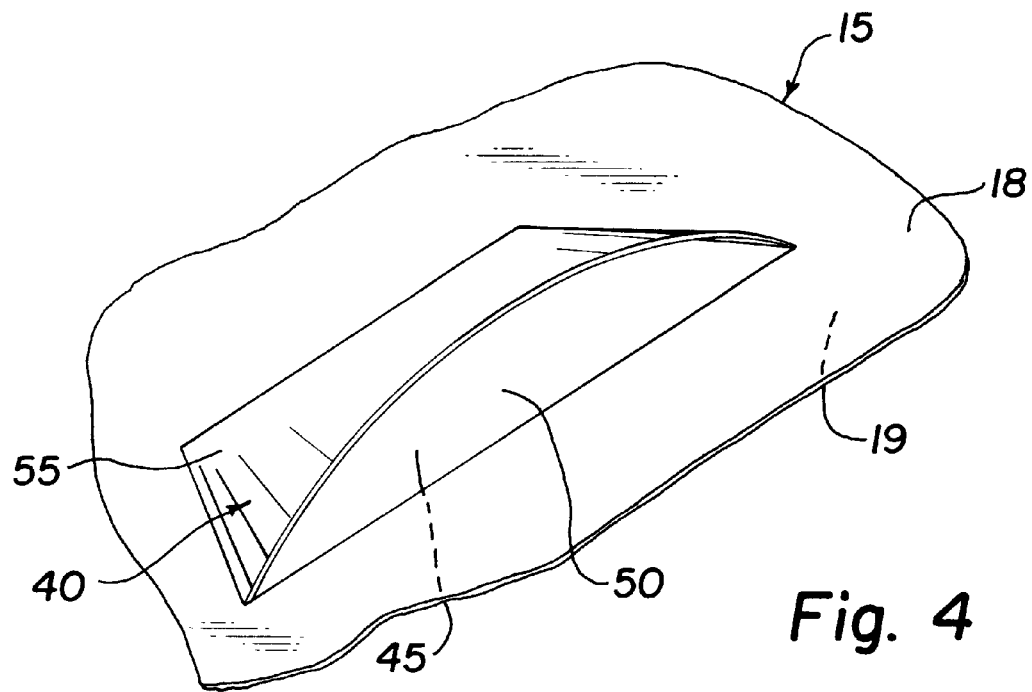
FIG. 4 is a perspective view of a protuberance of the present random packing element.

FIG. 4 illustrates a more detailed view of a protuberance 40 extending outwardly from first surface 18 of intermediate transfer element 15 of the preferred embodiment of FIG. 1. Protuberance 40 has a substantially curved surface 55, which is preferably curved in at least two dimensions, and is substantially convex in shape. A cavity 45 in second surface 19 of intermediate transfer element 15 is located opposite protuberance 40, and an aperture 50 penetrates through protuberance 40 and extends though intermediate transfer element 15 and into cavity 45. Though aperture 50 as illustrated in FIG. 4 penetrates protuberance 40 through the "side" of the protuberance instead of its "top", it should be understood that this invention does not require apertures to pierce a protuberance in any particular location.

Protuberances 40 advantageously serve a number of functions. The curved surface 55 of protuberance 40 increases the actual surface area of first surface 18. This greater surface area allows a greater volume of liquid to coat a random packing element. The greater volume of liquid coating a random packing element, in turn, increases the contact area between the coating liquid and other fluids within the random packing bed, thereby increasing the efficiency of mass transfer achieved by that random packing element.

Use of convex curved surface 55 of protuberance 40 can also achieve a thinner coating of liquid than a flat surface, thereby spreading a given volume of liquid over a greater area on first surface 18 and again increasing the contact area between the coating liquid and other fluids within the random packing bed. The thinner coating of liquid is achieved as a result of the "beading" process. In a bead of liquid located on a random packing element, only the liquid located on the surface of the bead may contact and react with other fluid in the random packing bed. Any liquid trapped under the surface of the bead is not available for interaction with other fluids. In a bead located on or over protuberance 40, volume otherwise occupied by liquid is instead occupied by the protuberance, thereby freeing that volume of liquid displaced by protuberance 40 for coating other areas of first surface 18 or some other surface of a random packing element. In short, curved surface 55 of protuberance 40 enhances the natural tendency of liquid droplets to form with curved surfaces.

The curved surface 55 of protuberance 40 also increases the rigidity and strength of body 1 of the random packing element. Random packing elements located on the bottom of a bed of random packing elements must support the weight of the random packing elements located above them. The rigidity and strength imparted by curved surface 55 of protuberance 40 therefore allows for the use of thicker beds, and may permit the use of cheaper but otherwise weaker materials in the construction of random packing elements.

Apertures 50 in protuberances 40 allow liquid to drip through intermediate transfer element 15 and thereby prevents pooling of fluid on either surface 18 or 19 of that element 15.

Figure 5:
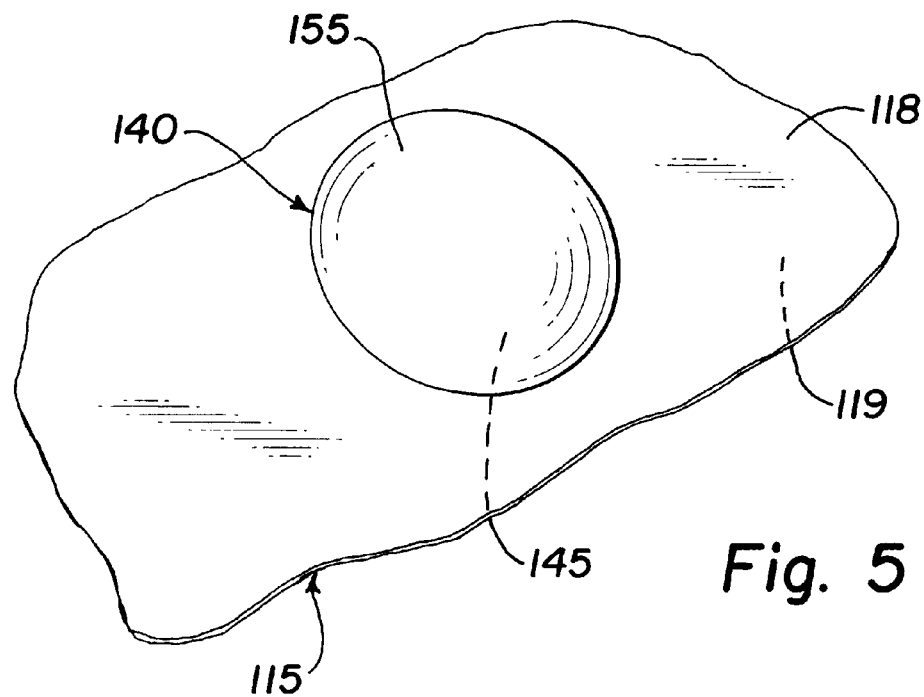
FIG. 5 is a perspective view of a protuberance of an alternate embodiment of the present random packing element.

FIG. 5 provides a view of an alternate embodiment of the present invention, wherein protuberance 140 is matched with corresponding cavity 145, but is not penetrated by an aperture. Protuberances 140 provide many of the advantages of protuberances 40 of FIG. 4, and unpierced curved surface 155 of protuberance 140 advantageously further increases the surface area of first surface 118 of intermediate transfer element 115. Embodiments of the present invention may also incorporate a combination of protuberances 40 of FIG. 4 and protuberances 140 of FIG. 5, thereby increasing surface area while maintain some apertures to prevent pooling.

Figure 6:
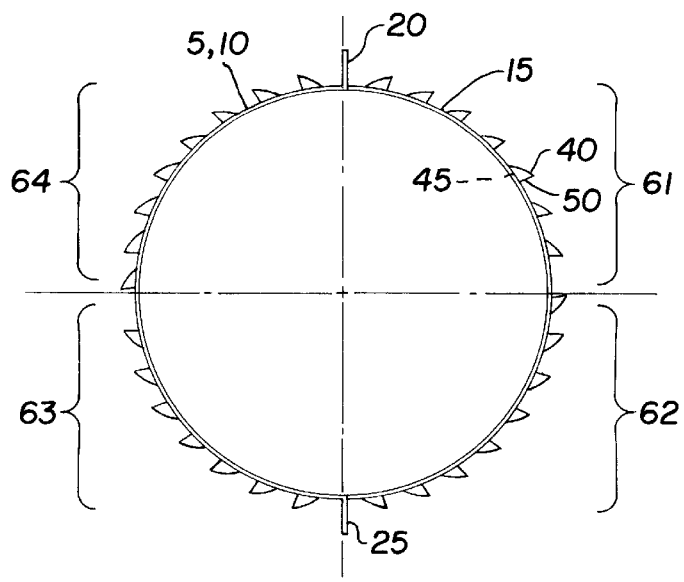
FIG. 6 is a top view of the present random packing element.

FIG. 6 illustrates a top view of the preferred embodiment of FIG. 1, and demonstrates the substantially cylindrical configuration of body 1 achieved when transfer element 15 curves outward in a direction substantially opposite from the direction in which upper transfer element 5 and lower transfer element 10 curve. This view also illustrates the pattern of protuberances 40 utilized in the preferred embodiment. Specifically, the cylinder formed by body 1 is divided into a first, second, third, and fourth quadrants 61, 62, 63 and 64, and all protuberances 40 and apertures 50 located within each quadrant are oriented in the same direction. Specifically, each aperture 50 is oriented toward the center of circle formed by transfer elements 5, 10 or 15. Though this pattern is utilized on the preferred embodiment, it should be understood that this invention does not require the use of this particular pattern, or of any fixed pattern at all. Furthermore, protuberances 40 may be located on either or both the surfaces of a transfer element.

Figure 7:
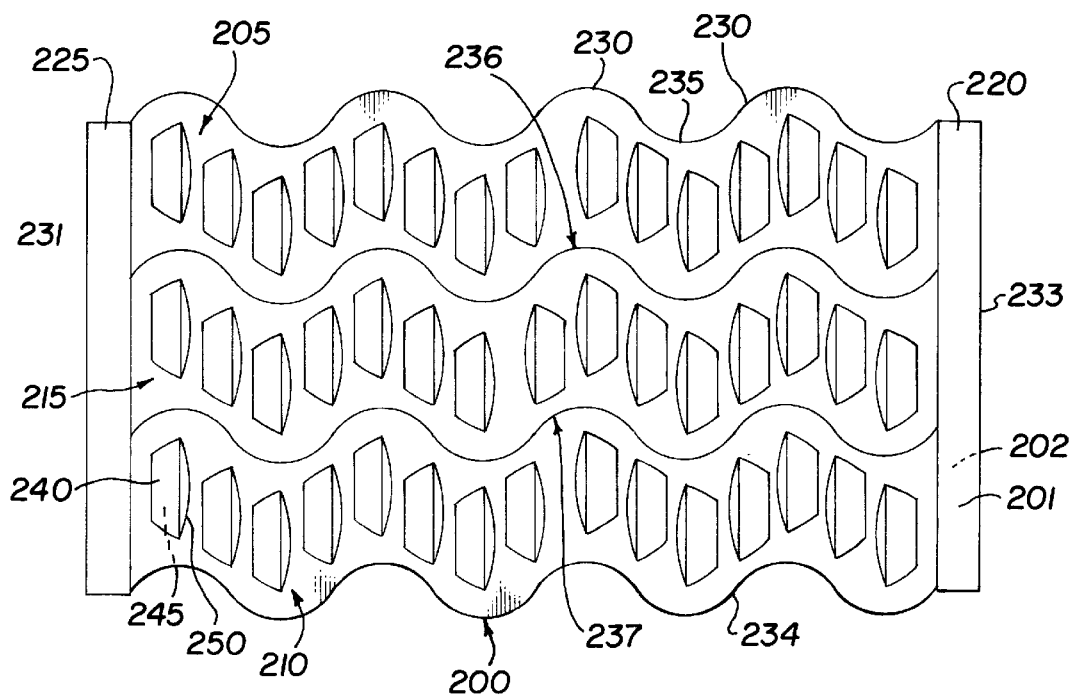
FIG. 7 is a front view of the piece of a sheet from which the present random packing element may be constructed.

FIG. 7 illustrates a sheet 200, preferably of metal, and most preferably of steel or aluminum, from which the preferred embodiment of FIG. 1 may be constructed. Sheet 200 is substantially rectangular in configuration, and has a first side 201, a second side 202, and a first, second, third and fourth edge 231, 232, 233, and 234. First edge 231 and third edge 233 are located opposite one another and are substantially straight. Second edge 232 and fourth edge 234 are also located opposite one another, but are substantially sinuous in configuration, comprising a series of alternating semi-circular extensions 230 and depressions 235 with radii of about, for example, 3 millimeters.

To form the element of FIG. 1, a plurality of protuberances 240 are formed on first side 201 and second side 202 through mechanical "punching". This punching also forms cavities 245 on the side 201 or 202 opposite the side 202 or 201 from which protuberances 240 extend, and further forms apertures 250 which penetrate protuberances 240 and extend into corresponding cavities 245. The direction of the punches are controlled to create the desired orientation of apertures 250.

A first incisions 236 and a second incision 237 are made in sheet 200 approximately parallel to second edge 232 and fourth edge 234. First and second incisions 236 and 237 are located intermediate of, and do not connect with, first edge 231 and third edge 232. First and second incision 236 and 237 are substantially sinuous in configuration, being composed of a series of alternating semi-circular extensions 230 and depressions 235 with radii of about, for example, 3 millimeters. First and second incisions 236 and 237 define an upper transfer element 205, a lower transfer element 210, and an intermediate transfer element 215 located intermediate of upper transfer element 205 and lower transfer element 210. The area located between first edge 231 and the nearest ends of incisions 236 and 237 defines a first connecting strip 220, and the area located between third edge 233 and the nearest ends of incisions 236 and 237 defines a second connecting strip 225 (these boundary of strips 220 and 225 being illustrated in FIG. 7 with broken lines). Thus first incision 236 forms the lower edge of upper transfer element 205 and the upper edge of intermediate transfer element 215, while second incision 237 forms the lower edge of intermediate transfer element 215 and the upper edge of lower transfer element 210. Similarly, a portion of second edge 232 forms the upper edge of upper transfer element 205, and a portion of fourth edge 234 forms the lower edge of lower transfer element 210.

Upper transfer element 205 and lower transfer element 210 are then bent to form a substantially semi-cylindrical surface, and intermediate transfer element 215 is bent to form an opposing semi-cylindrical surface, so that sheet 200 adopts a substantially cylindrical configuration as shown in FIGS. 1 and 6.

It should be understood that the use of the terms "upper" and "lower" within this application is made purely for the purpose of convenience, and that this invention does not require any particular orientation of a random packing element with respect to the vertical axis. The location, size, and shape of the protuberances, the existence and orientation of any apertures, and the choice of surfaces of a transfer element from which the protuberances extend, are all variables which may be optimized depending upon the specific application to which the random packing elements of this invention are applied. Furthermore, it should be understood that the invention involves the use of protuberances, cavities, and specific transfer element edges on a random packing element (and methods of manufacturing the same) and that these elements may be utilized on any configuration of random packing element which incorporates a transfer element. For example, random packing elements similar to that of the preferred embodiment may include any number of opposing bowed transfer elements in addition to the three described herein, thereby generating a more elongated cylindrical configuration which may be appropriate for certain applications.

Furthermore, though the above description relates several embodiments of the instant invention, variations and additional features and functions within the skill of the art are also intended to be covered.

I claim:

1. A random packing element comprising:
   a transfer element, wherein said transfer element has an edge, said edge being configured with a plurality of alternating depressions and extensions having a radius of about 3 millimeters which increase the overall length of said edge.

2. The random packing element of claim 1, wherein said depressions and extensions are substantially curved in shape and said transfer element extends from a first straight connecting strip to a second straight connecting strip.

3. The random packing element of claim 2, wherein said edge is substantially sinuous in configuration and is the result of substantially sinuous incisions through sheet metal, such sinuous edge existing regardless of the shape taken by said random packing element.

4. The random packing element of claim 3, wherein said extensions are substantially semi-circular in shape and said depressions and extensions increase the overall length of said edge over the distance from said first straight connecting strip to said second straight connecting strip.

5. The random packing element of claim 4, wherein said depressions are substantially semi-circular in shape.

6. The random packing element of claim 1 wherein said transfer element has a first surface and a second surface, said first surface including a plurality of protuberances.

7. The random packing element of claim 6, wherein said protuberances have a substantially curved surface.

8. The random packing element of claim 7, wherein said curved surface is curved in at least two dimensions, and wherein said protuberance is substantially convex in shape.

9. The random packing element of claim 7, wherein said second surface includes a plurality of cavities corresponding to said protuberances in said first surface.

10. The random packing element of claim 9, wherein at least some of said protuberances include apertures extending through said protuberance and into said cavities corresponding to said protuberances.

11. The random packing element of claim 6, wherein said transfer element extends from a first straight connecting strip to a second straight connecting strip and further has an edge, said edge being configured with a plurality of alternating depressions and extensions, said extensions being substantially curved in shape, which increase the overall length of said edge.

12. The random packing element of claim 11, wherein said depressions are substantially curved in shape and wherein said edge is substantially sinuous in configuration.

13. The random packing element of claim 11, wherein said extensions and depressions are substantially semi-circular in shape and have a radius of about 3 millimeters.

14. A method for manufacturing a random packing element comprising:

providing a sheet having a first side and a second side;

forming a plurality of protuberances on said first side, wherein said protuberances are formed through punching and have a substantially curved surface for increasing the surface area of said first side;

cutting a plurality of incisions through said sheet for defining a plurality of transfer element; and bending said sheet to form a random packing element configuration.

15. A method for manufacturing a random packing element comprising:

providing a sheet having a first side and a second side;

forming a plurality of protuberances on said first side, wherein said protuberances are formed through punching and have a substantially curved surface for increasing the surface area of said first side;

cutting a plurality of incisions through said sheet for defining a plurality of transfer elements;

bending said sheet to form a random packing element configuration;

wherein at least one of said incisions is substantially sinuous in configuration and forms an edge of a transfer surface.

16. A method for manufacturing a random packing element comprising:

providing a sheet having a first side and a second side;

forming a plurality of protuberances on said first side, wherein said protuberances are formed through punching and have a substantially curved surface for increasing the surface area of said first side;

cutting a plurality of incisions through said sheet for defining a plurality of transfer elements;

bending said sheet to form a random packing element configuration;

wherein said second side has a plurality of cavities corresponding to said plurality of protuberances of said first side, and wherein at least one of said protuberances is penetrated by an aperture extending through said protuberance and into said cavity corresponding to said protuberance, and wherein at least one of said incisions is substantially sinuous in configuration and forms an edge of a transfer surface.

* * * * *